(12) United States Patent
So et al.

(10) Patent No.: US 7,617,380 B2
(45) Date of Patent: Nov. 10, 2009

(54) SYSTEM AND METHOD FOR SYNCHRONIZING TRANSLATION LOOKASIDE BUFFER ACCESS IN A MULTITHREAD PROCESSOR

(75) Inventors: Kimming So, Palo Alto, CA (US); Jason Leonard, San Jose, CA (US); Gurvinder S. Sareen, San Ramon, CA (US)

(73) Assignee: Broadcom Corporation, Irvine, CA (US)

( * ) Notice: Subject to any disclaimer, the term of this patent is extended or adjusted under 35 U.S.C. 154(b) by 271 days.

(21) Appl. No.: 11/212,950

(22) Filed: Aug. 25, 2005

(65) Prior Publication Data

US 2007/0050595 A1    Mar. 1, 2007

(51) Int. Cl.
*G06F 12/00*   (2006.01)
*G06F 9/26*    (2006.01)
*G06F 9/34*    (2006.01)

(52) U.S. Cl. .............. 711/207; 711/203; 711/205; 711/206

(58) Field of Classification Search ............ 711/206
See application file for complete search history.

(56) References Cited

U.S. PATENT DOCUMENTS

| | | | |
|---|---|---|---|
| 5,918,251 A * | 6/1999 | Yamada et al. | 711/207 |
| 6,049,867 A * | 4/2000 | Eickemeyer et al. | 712/228 |
| 6,523,104 B2 * | 2/2003 | Kissell | 711/206 |
| 6,697,935 B1 * | 2/2004 | Borkenhagen et al. | 712/228 |
| 2002/0144077 A1 * | 10/2002 | Andersson et al. | 711/203 |

\* cited by examiner

*Primary Examiner*—Brian R Peugh
*Assistant Examiner*—Ryan Bertram
(74) *Attorney, Agent, or Firm*—McAndrews, Heid & Malloy, Ltd.

(57) ABSTRACT

A system and method for synchronizing translation lookaside buffer (TLB) access in a multithread processor is disclosed. When a first exception is found while searching the TLB, the exception is handled. While the exception is handled, thread processors are restricted from requesting the handling of any other exception.

14 Claims, 3 Drawing Sheets

SYSTEM AND METHOD FOR SYNCHRONIZING TRANSLATION LOOKASIDE BUFFER ACCESS IN A MULTITHREAD PROCESSOR

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Concurrent Multithread (CMT) Processors contain multiple hardware thread units, each multithread processor can execute a program simultaneously. Access of a Translation Lookaside Buffer (TLB) may be required for many applications, e.g. digital signal processing (DSP). The TLB can translate addresses from virtual to real for every instruction and data memory access. Software programs can have program modules that operate at different levels of priority. An operation system may be required to preempt one program module in order to execute another program module of higher priority.

Limitations and disadvantages of conventional and traditional approaches will become apparent to one of skill in the art, through comparison of such systems with some aspects of the present invention as set forth in the present application with reference to the drawings.

BRIEF SUMMARY OF THE INVENTION

Aspects of the present invention may be found in a multithread processor, multiprocessor systems, or multi-core systems. The present invention discloses systems and methods for synchronizing translation lookaside buffer (TLB) access. When a first exception is found while searching the TLB, the exception is handled. While the exception is handled, thread processors are restricted from requesting the handling of any other exception.

These and other advantages, aspects and novel features of the present invention, as well as details of an illustrated embodiment thereof, will be more fully understood from the following description and drawings.

DETAILED DESCRIPTION OF THE INVENTION

Aspects of the present invention relate to access of a Translation Lookaside Buffer in a concurrent multithread processor. Although the following description may refer to a particular number of interrupts and thread processors, other configurations for Translation Lookaside Buffer access can be designed that have a differing number of interrupts and/or thread processors without departing from the spirit and scope of the present invention.

Figure 1:
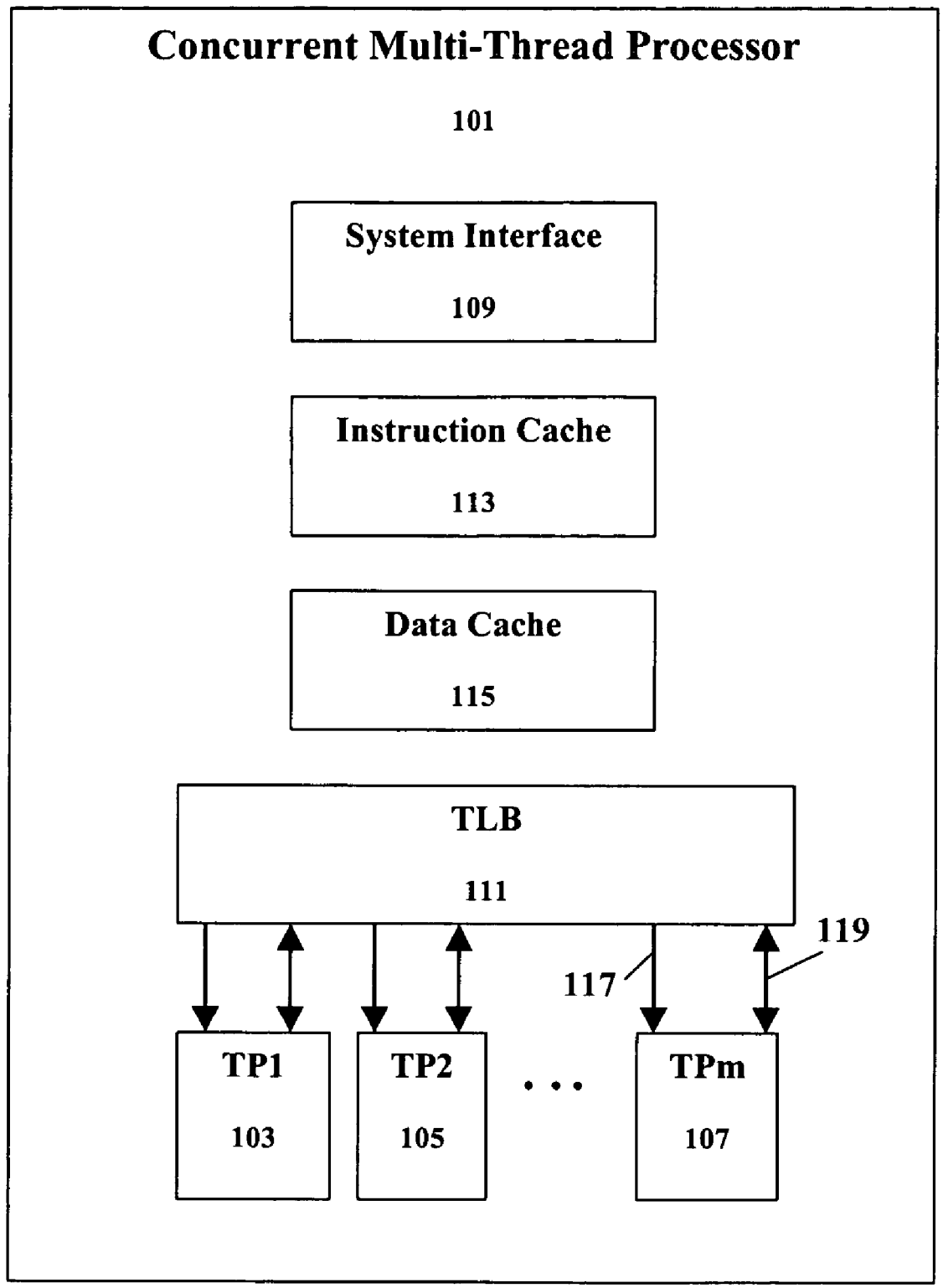
FIG. 1 is a block diagram of an exemplary architecture for Translation Lookaside Buffer access in a concurrent multithread processor in accordance with the present invention.

FIG. 1 is a block diagram of an exemplary architecture 100 for Translation Lookaside Buffer access from thread processors 103, 105, and 107 in a concurrent multithread (CMT) processor 101 in accordance with the present invention.

The CMT processor 101 contains a set of execution elements, called the thread processors (TP) 103, 105, and 107. Each TP 103, 105, and 107 can execute a program independently and receive external interrupts. TPs 103, 105, and 107 can share system resources such as a system interface 109, a translation lookaside buffer (TLB) 111, an instruction cache 113, and a data cache 115.

A memory access can manage a search of the TLB 111. For example, the $m^{th}$ TP 107 may read 117 from the TLB 111 and perform a normal memory access when a virtual page match is found. When a TLB search cannot match a virtual page in the TLB 111, a TLB miss exception is generated and the exception handler can use control registers and instructions to refill 119 a missing page translation in the TLB 111. The refill 119 will write the correct page translation into the memory of the TLB 111.

The TLB 111 can be shared by multiple TPs in a CMT processor 101. When one TLB exception is handled, the resource requirements may preclude another TLB exception from being handled. Therefore, the CMT processor allows one TLB exception at a time.

Figure 2:
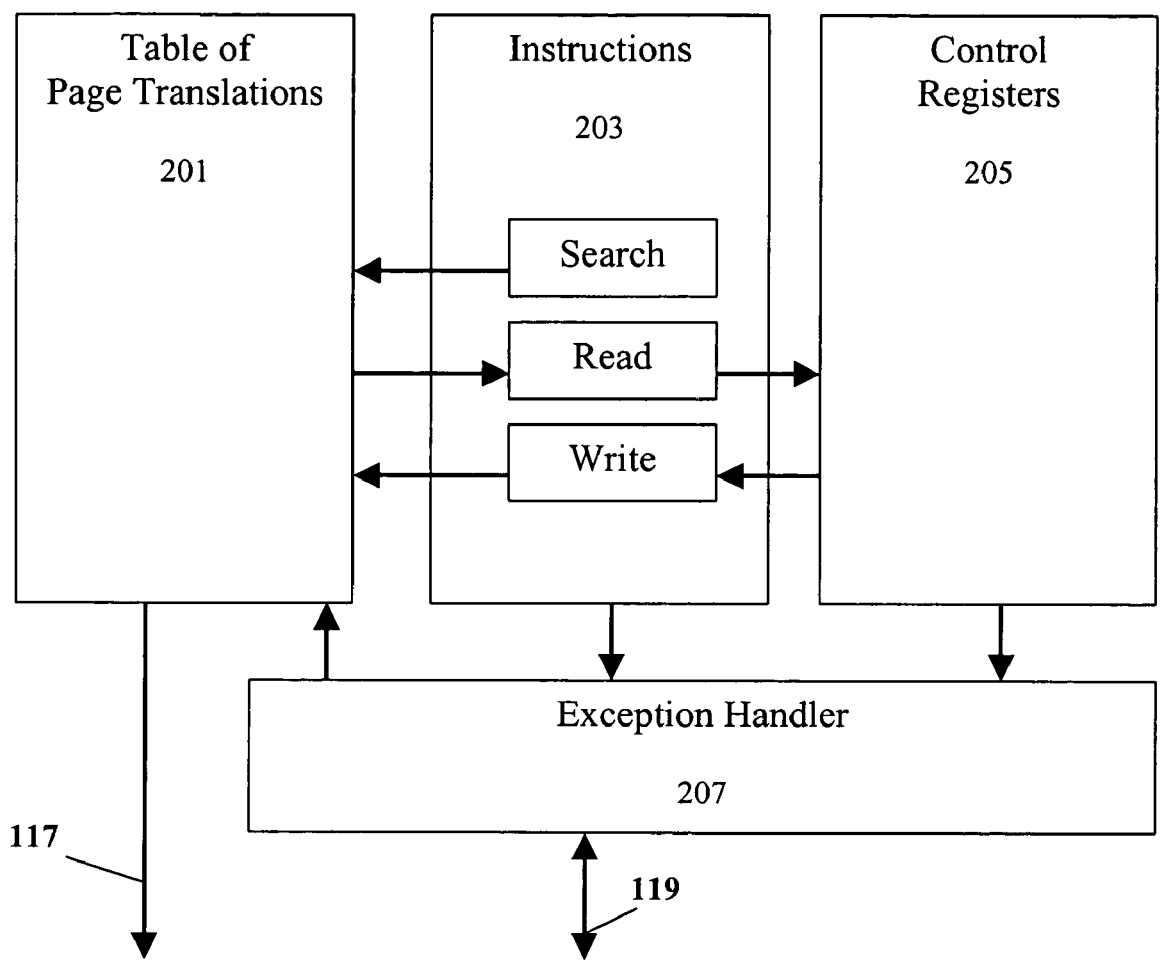
FIG. 2 is a block diagram of an exemplary Translation Lookaside Buffer in accordance with the present invention.

FIG. 2 is a block diagram of an exemplary Translation Lookaside Buffer (TLB) 111 in accordance with the present invention. The TLB 111 is comprised of a table of page translations 201, a set of instructions 203, a set of control registers 205, and an exception handler 207.

Each entry in the table 201 may contain a virtual page ID, a physical page ID, and a page size. A memory access can manage a search of the TLB 111. For example, the $m^{th}$ TP 107 may read 117 from the TLB 111 and perform a normal memory access when a virtual page match is found. When a TLB search cannot match a virtual page in the TLB 111, a TLB miss exception is generated and the exception handler 207 can use control registers 205 and instructions 203 to refill 119 a missing page translation in the table 201 of the TLB 111. The refill 119 will write the correct page translation into the memory of the TLB 111.

Instructions 203 may include reading, writing, and searching the table of virtual pages 201. The control registers 205 may hold the data that is to be written to a TLB virtual page or data that has been read from a TLB virtual page.

The exception handler 207 can replace the missing page in the table of virtual pages 201 by using the instructions 203 and control registers 205 in the TLB 111.

Figure 3:
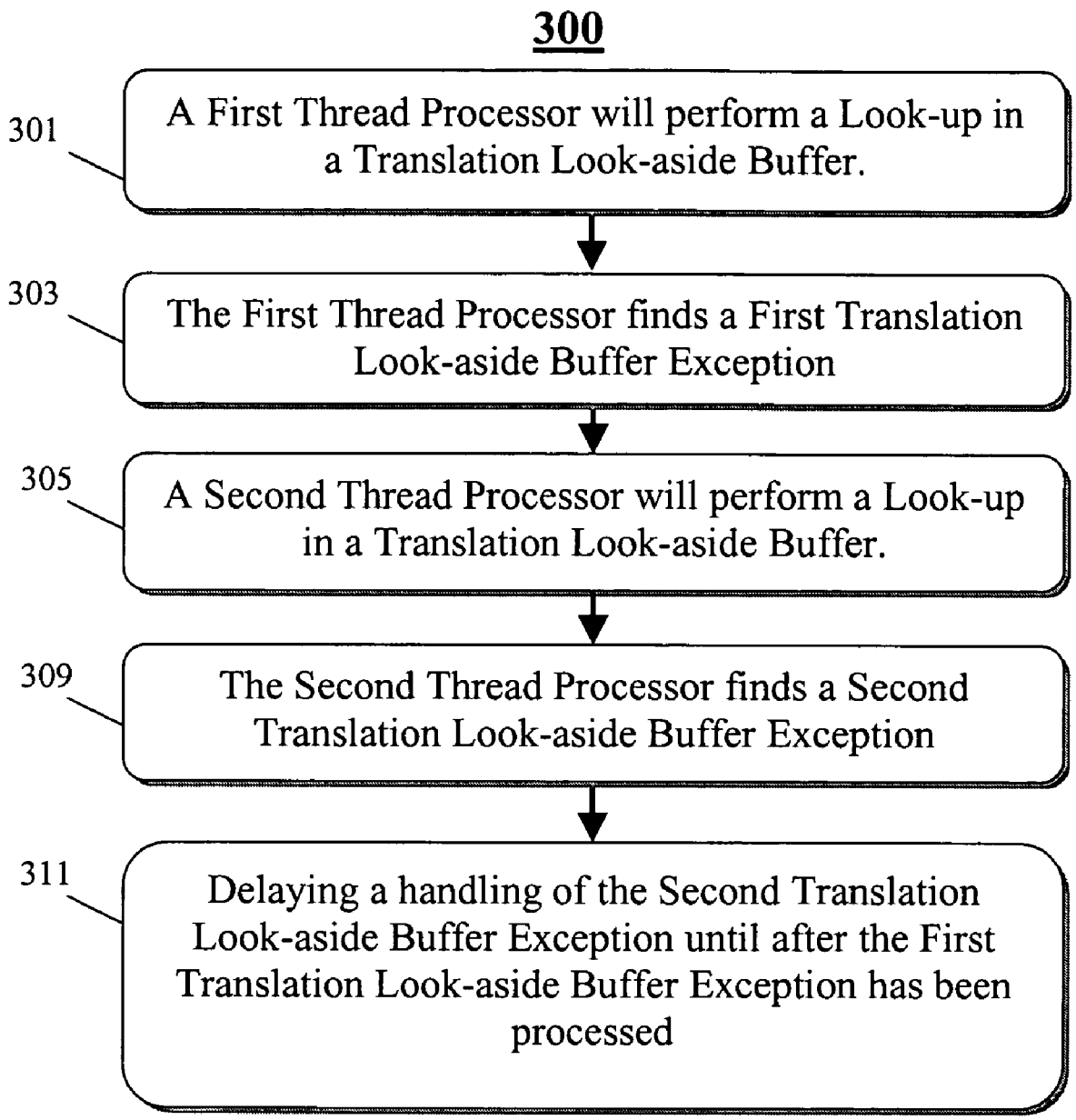
FIG. 3 is a flowchart illustrating an exemplary method for Translation Lookaside Buffer access in a concurrent multithread processor in accordance with a representative embodiment of the present invention.

FIG. 3 is a flowchart 300 illustrating an exemplary method for synchronizing Translation Lookaside Buffer (TLB) access in a concurrent multithread processor in accordance with a representative embodiment of the present invention.

A first thread processor searches a translation look-aside buffer at 301. The first thread processor finds a first TLB exception at 303. The exception can be caused by having a particular page missing from the plurality of virtual pages in the TLB. The processing of the first TLB exception may be indicated by setting a serialization bit to 'one'.

When a serialization bit is set, the TLB can be continuously searched by the second TP or searching can be stopped until the first TLB exception has been completed. A second thread processor searches the TLB at 305. If searching continues, the second thread processor may find a second TLB exception at 309. At 311, a handling of the second TLB exception is delayed until after the first TLB exception has been processed.

An exception handler can replace the missing page in the first TLB exception by using the instructions and control registers in the TLB. The serialization bit can be reset to 'zero' to indicate when the first TLB exception has been completed. Upon completion, the exception handler can execute a special 'return from exception' instruction to return the first thread processor to the program that searched the TLB. Handling of the second TLB exceptions can then be performed.

The present invention is not limited to the particular aspects described. Variations of the examples provided above may be applied to a variety of multithread processors without departing from the spirit and scope of the present invention.

Accordingly, the present invention may be realized in hardware, software, or a combination of hardware and software. The present invention may be realized in a centralized fashion in an integrated circuit or in a distributed fashion where different elements are spread across several circuits. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for synchronizing access to a translation lookaside buffer in a multithread processor, wherein the method comprises:
    finding a first translation lookaside buffer exception with a first thread processor;
    indicating that the first translation lookaside buffer exception is being processed, wherein processing the first translation lookaside buffer exception uses a control register to refill a missing page translation in a table of page translations in the translation lookaside buffer, wherein the control register holds data that has been read from a translation lookaside buffer virtual page;
    finding a second translation lookaside buffer exception with a second thread processor; and
    handling the second translation lookaside buffer exception after the first translation lookaside buffer exception has been processed.

2. The method of claim 1, wherein the first thread processor and the second thread processor search the translation lookaside buffer at the same time.

3. The method of claim 1, wherein a serialization bit is set to indicate that the first translation lookaside buffer exception is being processed.

4. The method of claim 3, wherein the serialization bit is reset to indicate that the first translation lookaside buffer exception has been processed.

5. The method of claim 1, wherein the translation lookaside buffer is searched when the first translation lookaside buffer exception is being processed.

6. The method of claim 1, wherein searching of the translation lookaside buffer is delayed while the first translation lookaside buffer exception is processed.

7. A system for controlling access of a translation lookaside buffer in a multithread processor, wherein the system comprises:
    an exception handler;
    a first thread processor for searching the translation lookaside buffer for a first exception, wherein the first exception is resolved by the exception handler which uses a control register to refill a missing page translation in a table of page translations in the translation lookaside buffer, wherein the control register holds data that has been read from a translation lookaside buffer virtual page;
    a second thread processor for searching the translation lookaside buffer for a second exception; and
    a memory for storing an indication that the first exception is being resolved, wherein the second exception is resolved after the first exception is resolved.

8. The system of claim 7, wherein the system further comprises a table of virtual pages, and wherein an exception occurs if a thread processor is searching for a virtual page that does not exist in the table of virtual pages.

9. The system of claim 8, wherein an exception is found when a particular virtual page is not in the plurality of virtual pages.

10. The system of claim 7, wherein the first thread processor and the second thread processor search the translation lookaside buffer at the same time.

11. The system of claim 7, wherein a serialization bit is set to indicate that the first translation lookaside buffer exception is being resolved.

12. The system of claim 11, wherein the serialization bit is reset to indicate that the first translation lookaside buffer exception has been resolved.

13. The system of claim 7, wherein the translation lookaside buffer is searched by the second thread processor while the first translation lookaside buffer exception is being resolved.

14. The system of claim 7, wherein searching of the translation lookaside buffer is delayed until after the first translation lookaside buffer exception is resolved.

* * * * *